Nov. 1, 1966     L. P. SALISBURY     3,281,982

FISH LURES

Filed April 16, 1965

LYLE P. SALISBURY
INVENTOR.

BY *Earl E Moore*

ATTY.

| United States Patent Office | 3,281,982 |
|---|---|
| | Patented Nov. 1, 1966 |

3,281,982
FISH LURES
Lyle P. Salisbury, 1192 Winston Court, Upland, Calif.
Filed Apr. 16, 1965, Ser. No. 448,804
3 Claims. (Cl. 43—42.5)

This invention relates to a novelty feature which is in combination with the closure means of a container, as for instance: metal and glass containers for liquids and other kinds of fluids. Such containers are now common in the market places for retailing various kinds of beverages such as beer, ale, sodas etc. Such "Lift the Tab and Pull" type opening means for metal containers are now in demand by the public in that no opening tool of any kind is required to open the cover portion of the container which carry drinks. From such a can or container one may, if he chooses, drink the contents directly from the can.

The invention is in combination with such cover portions of metal cans and the like, but when a glass or plastic type of container is provided with a metal top or plastic top as a closure means, the novel features of this invention can still be employed, that is, the base portion of a container may be of any suitable material since this invention is preferably used in combination with the closure means.

One of the principal objects of this invention is to provide "Lift the Tab and Pull" type of openers on container covers or closure means with a novel and useful feature, that is, providing a ready to use fish lure in combination with the mentioned type of openers.

Another object is to so combine the fish lure features with the opener means that when the container is opened, the lure device is presented with removed portion of the opener and it is complete except for a fish hook and a leader.

Other objects and features of the invention will become apparent upon perusal of the specification and the claims.

Figures 1, 5:
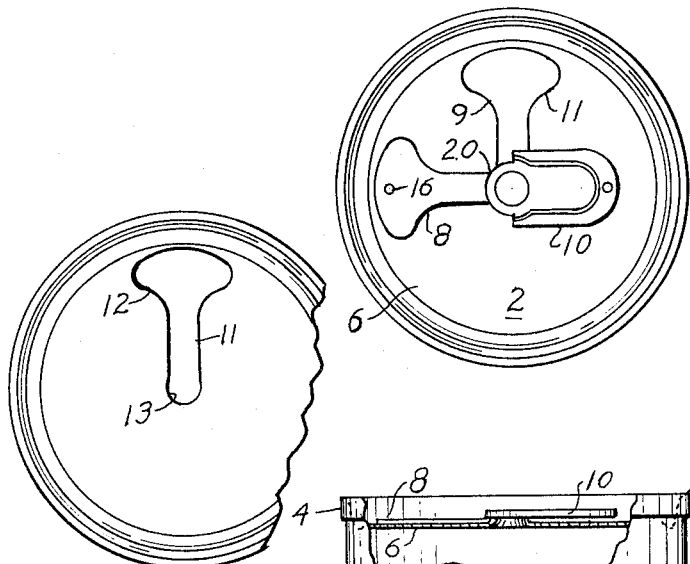
FIG. 1 is a top plan view of a metal container with the invention applied thereto.
FIG. 5 is a partial top plan view of that shown in FIG. 1 but showing how the top of the container appears when the opener is entirely removed, that is, pulled away from the container.
Figures 2, 3:
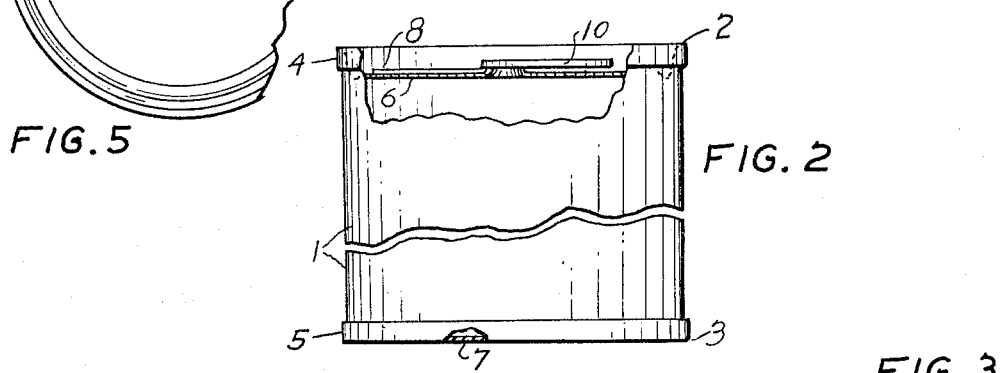
FIG. 2 is a side elevational view of the container with the upper portion broken away to show some details.
FIG. 3 is a bottom plan view of just the opener and lure combination of the container.

In order to show one workable form of the invention, attention is called to the drawings wherein like parts are given the same reference numerals, and wherein the invention is shown in combination with a typical beer can with the lift tab and pull type of opener; but it is to be understood that the novelty of this invention can be combined with various kinds of opener means for containers regardless of the material employed for construction of the container for housing fluids.

In the drawings, a beer can is shown that is made of a suitable metal, which may be coated sheet iron or tin, but in the event the container is made of glass, the top portion or cover would be a thin metal or a suitable plastic or other fluid tight material. The container or can has a cylindrical form, but may be in some other geometric form, that is, in cross section or longitudinally. The side of the can is indicated at 1, the top at 2 and the bottom at 3. The top, as well as the bottom 3, has the usual annular flanges 4 and 5, respectively, which are integral with their respective disc-like end cover plates 6 and 7. Obviously, the disc-like tops and bottoms would be reenforced by necessary ribs or corrugations, if required, to given them strength and this is especially true of the top when provided with a sealed opener that is to be pulled or otherwise pressured.

Figure 4:
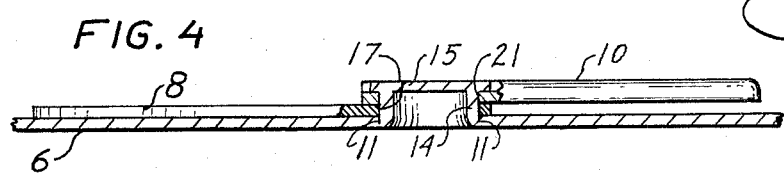
FIG. 4 is an enlarged sectional view, parts in elevation, showing in greater detail how the invention is applied to the opener portion of the container.

The novel portion of this invention is a flap or tab-like means indicated at 8, which is in combination with a sealer or rip portion 9 and a pull or lift portion or tab 10. The sealer 9 is an integral part of the top 6 of the can which is scored deeply or sufficiently along the line 11 in the manner indicated and preferably in the configuration shown so that when this sealer portion of the can top is removed by lifting and pulling it, a drinking and pouring opening 12 is provided, note FIG. 5. The scored lines are shown also in FIG. 4 at 11. The smaller opening 13 is at the center portion of the can top.

The upwardly pressed portion of the can top 6 provides an annular neck 14 and a cap-like pressed formed portion 15. The auxiliary flap or tab element 8 is configurated, as shown, to match the sealer 9, but it may be of any desirable form or shape. An opening 16 is provided to receive the clip end of a hook, not illustrated. The other end of the tab 8 is somewhat smaller and has the opening 17 through which the neck 14 of the can top 6 passes.

The tab 10 is a finger control pull tab and has the embossed marginal edge portion 18 to give it strength and in this edge portion is placed an opening 19 to which a leader or fishing line is attached, not illustrated. The other end of this tab has a reduced portion 20 with an opening 21 through which the neck 14 passes. The cap 15 is machine pressed to squeeze the top 6, tab 8 and tab 10 together and to hold them securely in place.

It should now be clear that when the tab 10 is lifted and pulled upwardly, the sealer 9 is ripped completely from the can top 6 along the scored line 11 to provide the openings 12–13. When the sealer is removed, the tabs 8 and 10 are removed therewith to present a fishing lure. The sealer 9 can be bent and twisted and hence shaped to suit the kind of fishing desired, that is the sealer can be curved to cause the lure to flip vertically and/or horizontally, or bent to make the lure twirl or rotate as it is pulled through the water or when it is placed in a fast moving stream.

Certain novel features and details of this invention are disclosed therein, and in some cases in considerable detail in order to make the invention clear in at least one form thereof. However, it is to be clearly understood that the invention, as disclosed, is not necessarily limited to the exact form and details disclosed since it is apparent that various modifications and changes may be made without departing from the spirit and scope of the invention.

Having thus described my invention, what is claimed as new and desired to be secured by Letters Patent is:

1. An opener combination for a container comprising a sealer element, a lift tab for removing the sealer element from the container, and a connector tab for joining a fishing hook to the lift tab and the sealer element, said sealer element, lift tab and connector tab each having only one of their ends commonly joined and secured to each other.

2. An opener means for a container and shaped to provide a fish lure when the opener means is removed from the container and including a sealer flap element and a lift tab, the opener means when removed from the container having a plurality of parts attached to each other, said parts comprising said lift tab for connection to a fishing line, a connector tab for attachment to a fishing hook, and said sealer flap element formable to control the action of the lure while in the water, said lift tab, connector tab and sealer flap element each having only one of their ends commonly joined and secured to each other.

3. A combination sealer means for containers and the like including means to present a fishing lure when the combination sealer means is removed from a container and the like, the sealer means including a container closure means which is scored in outline to present a sealer means portion of the closure means, and which sealer means portion is to be removed from the closure means; and a finger control means for removing the sealer means portion, and a tab-like means connected to the sealer means portion and the finger control means, and wherein the finger control means and the tab means are provided with means to which a fishing hook and line can be attached, said sealer means portion, finger control means, and tab-like means each having only one end commonly joined and secured to each other.

References Cited by the Examiner

UNITED STATES PATENTS

| | | | |
|---|---|---|---|
| 1,468,148 | 9/1923 | Gaess | 43—42.5 X |
| 2,484,747 | 10/1949 | Russell | 43—42.5 X |
| 2,507,772 | 5/1950 | Cummins | 43—42.5 |
| 2,511,002 | 6/1950 | Perry | 43—42.5 |
| 2,986,812 | 6/1961 | Arter et al. | 43—42.5 X |
| 3,084,835 | 4/1963 | Walsh. | |

OTHER REFERENCES

Popular Mechanics Magazine, February 1964, page 16.

SAMUEL KOREN, *Primary Examiner.*

ALDRICH F. MEDBERY, *Examiner.*

D. J. LEACH, *Assistant Examiner.*